(12) United States Patent
Aoki (10) Patent No.: US 9,401,182 B2
(45) Date of Patent: Jul. 26, 2016

(54) RACK MOUNT DEVICE (71) Applicant: FUJITSU LIMITED, Kawasaki-shi, Kanagawa (JP)

(72) Inventor: Kenji Aoki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 117 days.

(21) Appl. No.: 14/220,796

(22) Filed: Mar. 20, 2014

(65) Prior Publication Data

US 2014/0313662 A1   Oct. 23, 2014

(30) Foreign Application Priority Data

Apr. 22, 2013 (JP) ................................ 2013-089260

(51) Int. Cl.
*H05K 5/00* (2006.01)
*G11B 33/12* (2006.01)

(52) U.S. Cl.
CPC ............ *G11B 33/128* (2013.01); *G11B 33/126* (2013.01)

(58) Field of Classification Search
CPC .... G11B 33/126; G11B 33/128; G11B 33/00; H05K 7/1491; H05K 7/14; H05K 7/1485–7/1489; G06F 1/187; G06F 1/181–1/184
USPC .......... 361/679.33–679.39, 679.49, 724–727, 361/824–827, 694, 784–786, 788, 792, 361/796; 312/223.1, 223.2, 223.3
See application file for complete search history.

(56) References Cited

U.S. PATENT DOCUMENTS

| | | | | |
|---|---|---|---|---|
| 5,649,415 A * | 7/1997 | Pea | ......................... | F16G 13/16 191/12 C |
| 6,621,692 B1 * | 9/2003 | Johnson | ............... | H05K 7/1421 312/223.1 |
| 8,331,085 B2 * | 12/2012 | Zhang | ..................... | G06F 1/184 174/365 |
| 8,335,076 B2 * | 12/2012 | Zhang | ..................... | G06F 1/184 174/365 |
| 8,373,983 B2 * | 2/2013 | Zhang | .................. | H05K 7/1491 174/542 |
| 8,599,550 B2 * | 12/2013 | Davis | ................... | G11B 33/128 361/679.33 |
| 9,001,514 B2 * | 4/2015 | Rust | ........................ | H05K 7/02 361/727 |
| 2003/0231420 A1 | 12/2003 | Kano et al. | | |
| 2006/0290245 A1 | 12/2006 | Hidaka | | |

(Continued)

FOREIGN PATENT DOCUMENTS

| | | |
|---|---|---|
| JP | 3-287391 | 12/1991 |
| JP | 2004-22059 | 1/2004 |
| JP | 2007-4538 | 1/2007 |

*Primary Examiner* — Hoa C Nguyen
*Assistant Examiner* — Sagar Shrestha
(74) *Attorney, Agent, or Firm* — Staas & Halsey LLP (57) ABSTRACT

A rack mount device comprising: a housing; first and second drawer sections to be withdrawable from the housing; storage sections provided in the first and second drawer sections, each of storage sections including memory devices; a control module to control the memory devices; a connection cable to couple an external connection terminal of the housing and the control module and include an excess length portion corresponding to movement of the control module; a cable protective tube to be inserted by the excess length portion, one end of the cable protective tube fixed in a vicinity of a connection portion to the control module of the connection cable, another end of the cable protective tube fixed on a bottom plate side of the housing, the cable protective tube including a folded-up section which moves along with the drawing operation; and a cable protective tube deformation device to move the folded-up section.

20 Claims, 10 Drawing Sheets

(56) References Cited

U.S. PATENT DOCUMENTS

| | | | | |
|---|---|---|---|---|
| 2007/0230111 A1* | 10/2007 | Starr | .................... | H05K 7/1487 |
| | | | | 361/679.31 |
| 2010/0123377 A1* | 5/2010 | Hsu | ...................... | H05K 7/1491 |
| | | | | 312/330.1 |
| 2010/0172083 A1* | 7/2010 | Randall | ................ | G11B 33/126 |
| | | | | 361/679.31 |
| 2010/0172087 A1* | 7/2010 | Jeffery | .................. | G11B 33/02 |
| | | | | 361/679.33 |
| 2010/0265645 A1* | 10/2010 | Wang | ..................... | G06F 1/183 |
| | | | | 361/679.4 |
| 2012/0050974 A1* | 3/2012 | Chen | .................... | H05K 7/1494 |
| | | | | 361/679.21 |
| 2012/0134095 A1* | 5/2012 | Zhang | .................... | G06F 1/181 |
| | | | | 361/679.33 |
| 2013/0120927 A1* | 5/2013 | Wen | ....................... | G06F 1/187 |
| | | | | 361/679.39 |
| 2014/0204522 A1* | 7/2014 | Keffeler | ............... | G11B 33/128 |
| | | | | 361/679.31 |
| 2014/0204525 A1* | 7/2014 | Pecone | .................. | H05K 13/00 |
| | | | | 361/679.33 |
| 2014/0293523 A1* | 10/2014 | Jau | .......................... | H05K 7/14 |
| | | | | 361/679.4 |

* cited by examiner

RACK FRONT SIDE

RACK MOUNT DEVICE

CROSS-REFERENCE TO RELATED APPLICATION

This application is based upon and claims the benefit of priority of the prior Japanese Patent Application No. 2013-089260, filed on Apr. 22, 2013, the entire contents of which are incorporated herein by reference.

FIELD

The embodiments discussed herein are related to a rack mount device.

BACKGROUND

In a rack mount device or a disk array device, a unit that stores a plurality of memory devices, for example, hard disk devices (hereinafter, referred to as HDDs) in a housing is withdrawably installed in a rack. Such devices are used as a storage device in a data center. Since a large amount of data is exchanged in such data center, there is a demand for an increased number of HDD allowed to be installed in one rack, for example, increased capacity per unit installation area.

Related techniques are disclosed in Japanese Laid-open Patent Publication Nos. 2007-4538 and 2004-22059.

SUMMARY

According to one aspect of the embodiments, a rack mount device includes: a housing; a first drawer section and a second drawer section, provided in the housing, configured to be withdrawable from the housing; storage sections provided in the first drawer section and the second drawer section respectively, each of storage sections being capable of including a plurality of memory devices; a control module, provided on an upper side of the storage sections, configured to control the plurality of memory devices; a connection cable configured to couple an external connection terminal of the housing and the control module and include an excess length portion corresponding to movement of the control module based on a drawing operation of the first drawer section or the second drawer section; a cable protective tube configured to be inserted by the excess length portion, one end of the cable protective tube being fixed in a vicinity of a connection portion to the control module of the connection cable, another end of the cable protective tube being fixed on a bottom plate side of the housing, the cable protective tube including a folded-up section which moves along with the drawing operation between the one end and the another end; and a cable protective tube deformation device configured to move the folded-up section.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A width of a rack where disk enclosures (hereinafter, referred to as DEs) that store a plurality of HDDs and a controller enclosure are stacked and equipped (hereinafter, referred to as mounted) is standardized to be 19 inches by the Electronic Industries Alliance (EIA) and the Japanese Industrial Standards (JIS). A basic unit of the height of an instrument to be mounted in a 19-inch rack is 1 U, which signifies one unit, and 1 U by the EIA is 44.45 millimeter.

Figures 1A, 1B, 1C:
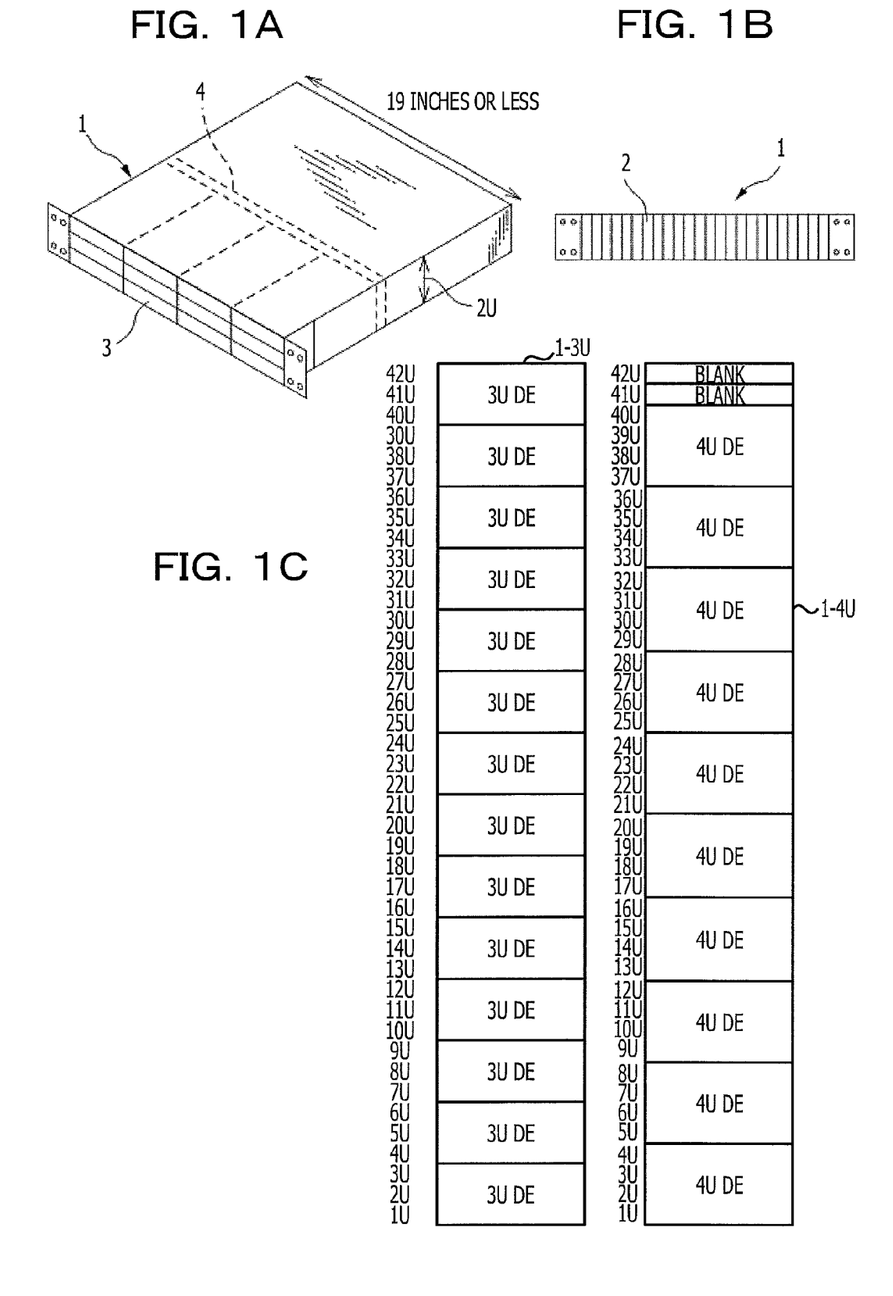
FIG. 1A illustrates an example of a perspective view of a disk enclosure.
FIG. 1B illustrates an example of a front view of a disk enclosure.
FIG. 1C illustrates an example of a disk enclosure with a 3 U height and an example of a disk enclosures with a 4 U height.

FIG. 1A illustrates an example of a perspective view of a disk enclosure. The height of DE 1 illustrated in FIG. 1A is 2 U, and 12 3.5-inch HDDs 3 are stored horizontally in the DE 1. The HDDs 3 are coupled to a midplane (may also be referred to as a backplane) 4 in the DE 1, and control modules and a power supply unit are installed in the rear side from the midplane 4 inside the DE 1. The capacity of the DE 1 illustrated in FIG. 1A per unit installation area is 6 HDD/1 U.

FIG. 1B illustrates an example of a front view of the disk enclosure. As illustrated in FIG. 1B, 24 2.5-inch HDDs 2 are stored in a DE 1 with a 2 U height. In a case of high density packaging by storing the 3.5-inch HDDs in vertical alignment in the 19-inch rack, the vertical length of the HDD is 147 mm and the 3 U height is 133.35 mm, so that a DE may have a height of 4 U. For example, in a case that there is a HDD to be replaced and repaired among the HDDs stored in the plurality of DEs mounted in the 19-inch rack, replacement (active maintenance) of the failed HDD is carried out while operating other HDDs stored in the DEs. For the active maintenance, the failed HDD is drawn out of the DE by setting the height of the DEs as 4 U.

The 19-inch rack is manufactured to have a height of approximately 2 m from the constraints of transportation and installation, and has a height equivalent to 42 U. FIG. 1C illustrates an example of a disk enclosure with a 3 U height and a disk enclosure with a 4 U height. When DEs 1-4 U with a 4 U height are mounted in the 19-inch rack with a height equivalent to 42 U, a 2 U dead space may be created in the uppermost as illustrated on the right half of FIG. 1C. For example, ten 4 U height DEs are mounted in the 19-inch rack and a void of 2 U may be created in the uppermost portion. In a case of mounting DEs 1-3U with a 3 U height in the 19-inch rack as illustrated on the left half of FIG. 1C, a void may not be created in the uppermost portion in the 19-inch rack.

Figures 2A, 2B:
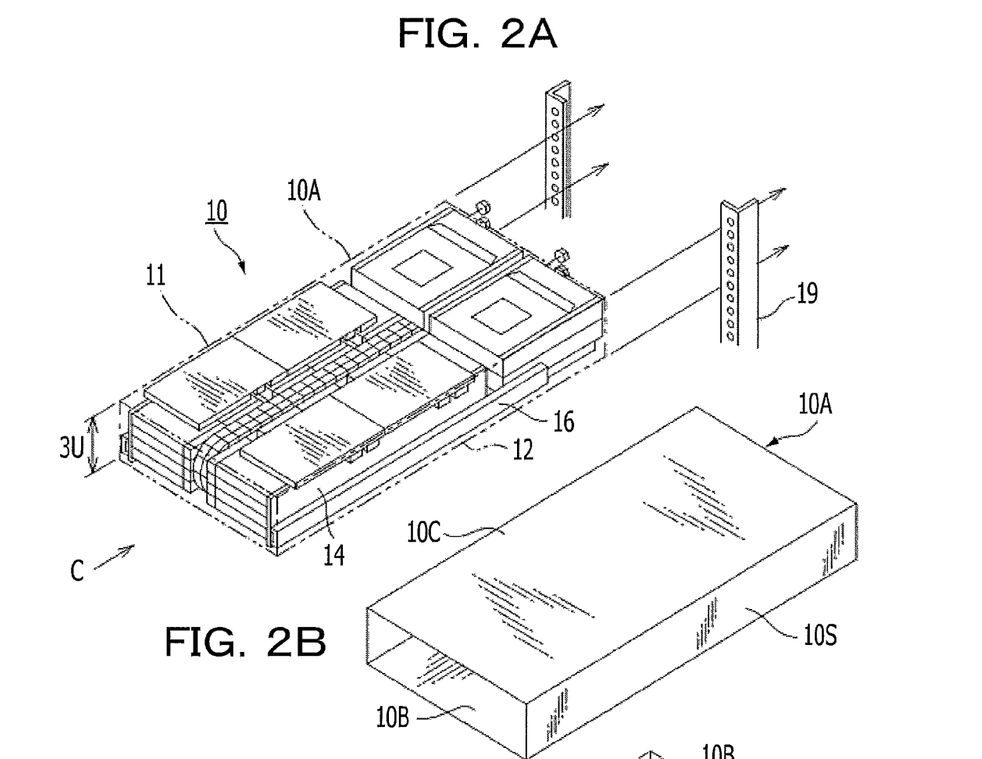
FIG. 2A illustrates an example of a perspective view of a rack mount device.
FIG. 2B illustrates an example of a perspective view of a housing of a rack mount device.
Figure 2C:
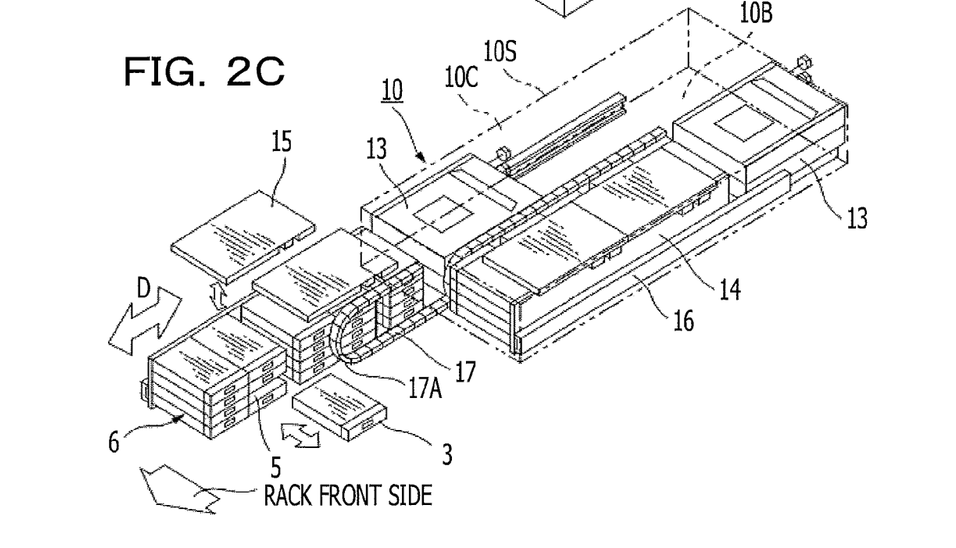
FIG. 2C illustrates an example of a housing of a rack mount device.

FIG. 2A illustrates an example of a perspective view of a rack mount device. FIG. 2B illustrates an example of a perspective view of a housing of the rack mount device. FIG. 2C illustrates an example of a housing of the rack mount device. FIG. 2A illustrates a structure in which a rack mount device 10 is implemented in a 19-inch rack 19. The rack mount device 10 includes a housing 10A having a width to be attached to the 19-inch rack 19 and a 3 U height. In the housing 10A, as two drawer sections, a first drawer section 11 and a second drawer section 12 are stored. The housing 10A is provided with, as illustrated in FIG. 2B, a bottom plate 10B, a ceiling plate 10C, and side plates 10S with a 3 U height.

The first drawer section 11 and the second drawer section 12 are withdrawable forward from the front side of the 19-inch rack 19 independently from the housing 10A as illustrated in FIG. 2C. An arrow D indicates directions of withdrawal from the housing 10A and storage to the housing 10A of the first drawer section 11 and the second drawer section 12. Hereinafter, the front side of the 19-inch rack 19 may be referred to as the front of the first drawer section 11 and the second drawer section 12, and the rear side of the 19-inch rack 19 may be referred to as the rear of the first drawer section 11 and the second drawer section 12. The first drawer section 11 and the second drawer section 12 are withdrawable to the front side of the 19-inch rack 19 by slide rails 16 attached inside the side plates 10S of the housing 10A. The first drawer section 11 and the second drawer section 12 are arranged symmetrically with respect to the withdrawal direction.

The first drawer section 11 and the second drawer section 12 may be formed in a box shape, similar to the housing 10A, having a bottom plate, a ceiling plate, and side plates, and may also be formed in a tray shape where members are stacked. On the front side of the first drawer section 11 and the second drawer section 12, a HDD storage section 6 provided with cells 5 that are aligned in four tiers in the height direction and five rows in the horizontal direction and individually allow the 3.5-inch HDD 3 to be inserted therein is equipped. In the cell rows of the HDD storage section 6, from the front side of the first drawer section 11 and the second drawer section 12, a first row, a second row, a third row as a center row, a fourth row, and a fifth row in the most rearward are arranged, respectively. On the side plate 10S sides of the housing 10A of the HDD storage section 6, midplanes 14, which are coupled to the HDDs 3 inserted in the cells 5 so as to allow signal transfer, are equipped.

On the ceiling plate 10C side of the housing 10A in the first and second drawer sections 11 and 12, control modules 15 that are coupled to the midplanes 14 and control the HDDs 3 inserted in the cells 5 individually are equipped. The control modules 15 may also be called as IOMs (input/output modules). The control modules 15 may be arranged divided into a plurality, for example, two and one control module 15 may also be arranged singly. On the rear side of the first and second drawer sections 11 and 12, power supply units 13 are equipped. The power supply units 13 supply electrical power to the HDDs 3 stored in the HDD storage section 6, the midplanes 14, the control modules 15, and the like.

Figure 7:
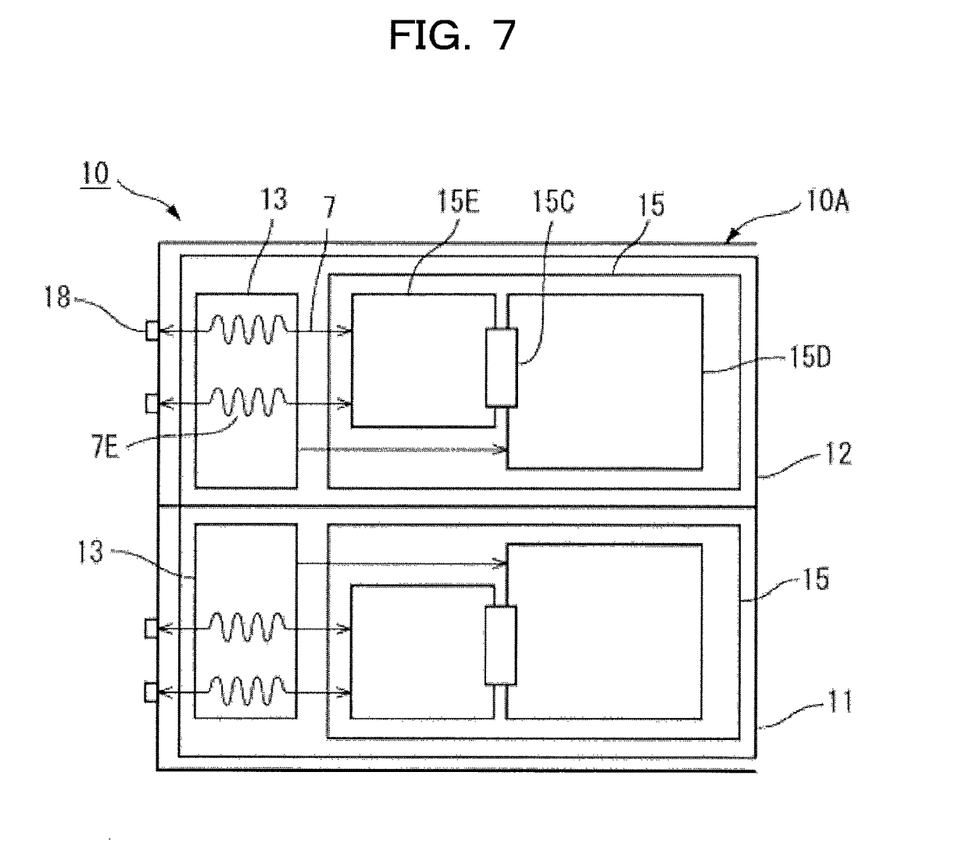
FIG. 7 illustrates an example of an arrangement of an electrical circuit.

FIG. 7 illustrates an example of arrangement of an electrical circuit. In the housing 10A of the rack mount device 10, the first and second drawer sections 11 and 12 are stored withdrawably. In the control modules 15 installed on the front side of the first and second drawer sections 11 and 12, a driving section 15D to drive the HDDs and a decompression section 15E to decompress data retrieved from the HDDs, which are coupled by a connector 15C, are provided. The power supply units 13 installed on the rear side of the first and second drawer sections 11 and 12 supply a power supply to the driving section 15D. The decompression section 15E is coupled to external connection terminals 18 equipped in a rear end portion of the rack mount device 10 by connection cables 7. Since the first and second drawer sections 11 and 12 are withdrawn with respect to the housing 10A, the connection cables 7 have excess length portions 7E longer than the travel distance of the first and second drawer sections 11 and 12.

In FIG. 2B, cable protective tubes 17 equipped respectively in portions between the first and second drawer sections 11 and 12 have the excess length portions 7E of the connection cables 7 illustrated in FIG. 7 built therein for their protection, restrict movement in a lateral direction and are provided with flexibility. For example, the cable protective tubes 17 may be made of a resin, and since being deformed only in the vertical directions, during a drawing operation of one of the drawer sections, the cable protective tubes 17 may not affect the other drawer section. One end of the cable protective tube 17 is fixed in the vicinity of a connection portion to the control module 15 of the connection cable 7, and the other end is fixed on the bottom plate 10B of the housing 10A. Therefore, the cable protective tubes 17 may have folded up sections 17A.

Figure 3A:
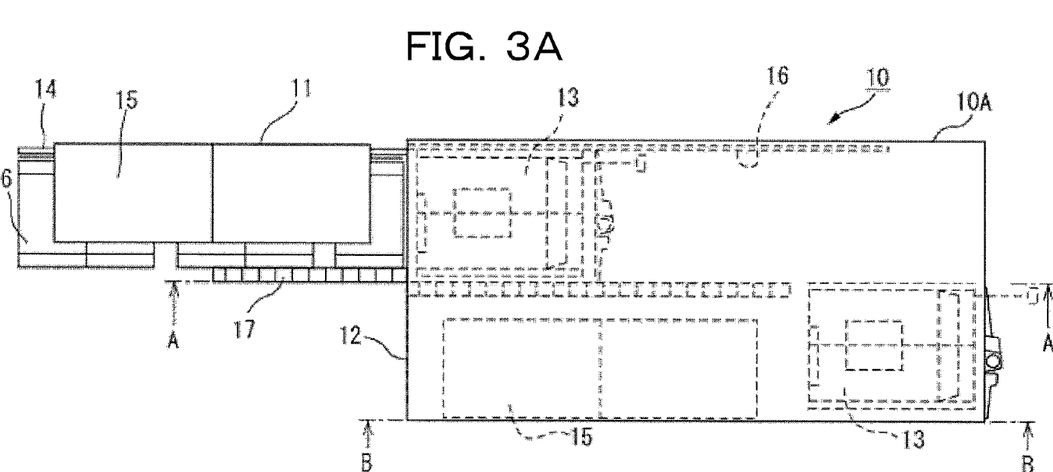
FIG. 3A illustrates an example of a plan view of a rack mount device.
Figure 3B:
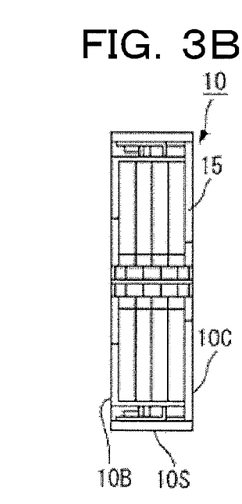
FIG. 3B illustrates an example of a front view of the rack mount device.
Figure 3C:
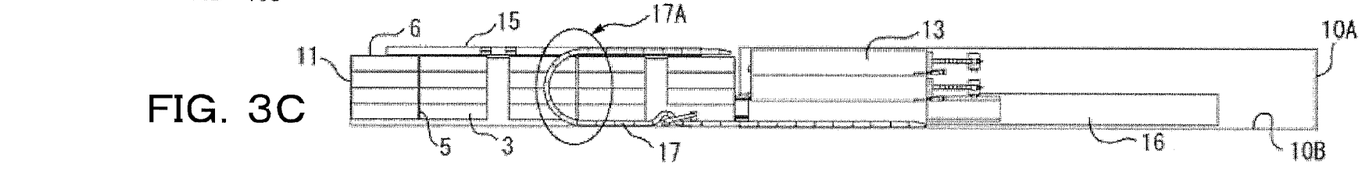
FIG. 3C illustrates an example of a side view of the rack mount device.
Figure 3D:
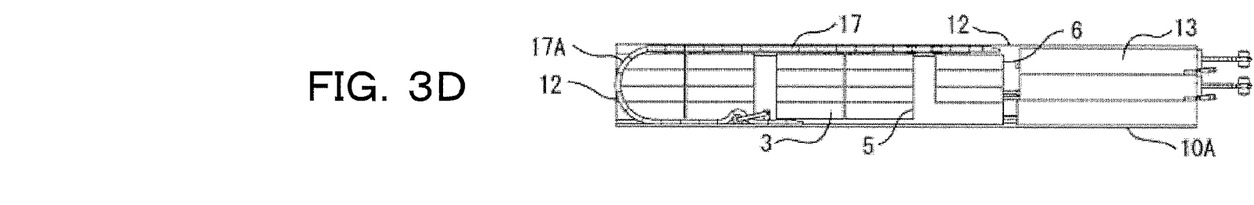
FIG. 3D illustrates an example of a side view of the rack mount device.
Figure 5:
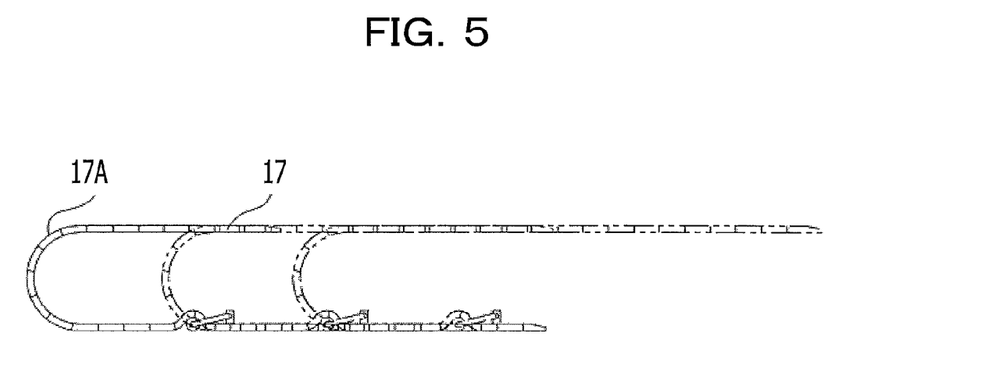
FIG. 5 illustrates an example of cable protective tube deformation.

FIG. 3A illustrates an example of a plan view of a rack mount device. FIG. 3A illustrates a state of a planar view of the rack mount device 10 illustrated in FIG. 2B. FIG. 3B illustrates an example of a front view of a rack mount device. FIG. 3B illustrates a front view of the rack mount device 10 illustrated in FIG. 2A viewed from the arrow C direction. FIG. 3C illustrates an example of a side view of a rack mount device. FIG. 3C illustrates a side view of the rack mount device 10 illustrated in FIG. 3A viewed from a line between arrows A. FIG. 3D illustrates an example of a side view of a rack mount device. FIG. 3D illustrates a side view of the rack mount device 10 illustrated in FIG. 3A viewed from a line between arrows B. One end of the cable protective tubes 17 on the control module 15 side is fixed in the vicinity of the control modules 15 on the upper side of the HDD storage section 6, and the other end is fixed on the bottom plate 10B of the housing 10A. When the first drawer section 11 is withdrawn from the housing 10A, the position of the folded up section 17A of the cable protective tube 17 moves. FIG. 5 illustrates an example of cable protective tube deformation. FIG. 5 illustrates deformation of the cable protective tube 17 when one of the drawer sections is withdrawn from the housing of the rack mount device.

Figure 4A:
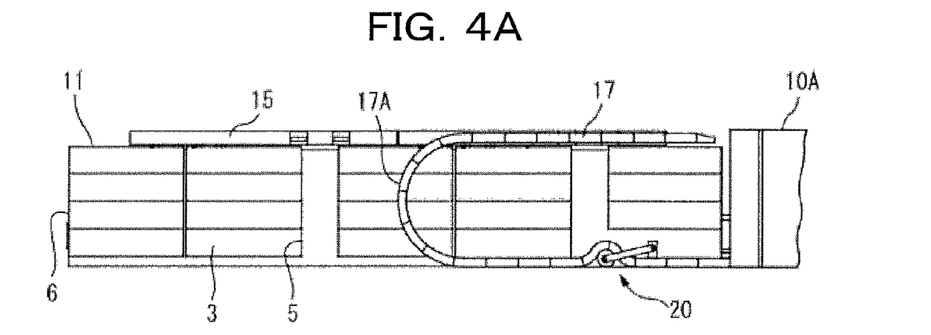
FIG. 4A illustrates an example of a state of a drawer section.

FIG. 4A illustrates an example of a state of a drawer section. FIG. 4A illustrates a state of the first drawer section 11 in the vicinity of the folded up section 17A of the cable protective tube 17 illustrated in FIG. 3C in enlargement. When one of the drawer sections, for example, the first drawer section 11 is withdrawn from the housing 10A of the rack mount device, the folded up section 17A of the cable protective tube 17 is located in front of the cells 5 in the center row of the HDD storage section 6 in which the HDDs 3 are inserted. In this state, the HDDs 3 inserted in the cells 5 in other rows of the HDD storage section 6 are replaceable. For example, in a case that the HDD 3 inserted in the cell 5 in the center row of the HDD storage section 6 has to be replaced, the HDD 3 inserted in the cell 5 in the center row of the HDD storage section 6 may not be replaced because the folded up section 17A of the cable protective tube 17 interrupts.

Figure 4B:
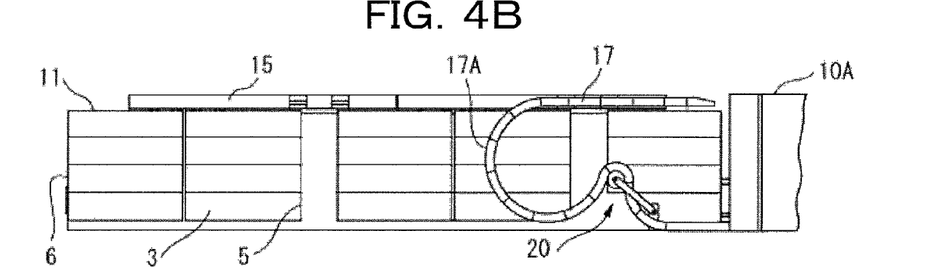
FIG. 4B illustrates an example of a change in position of a folded up section of a cable protective tube.
Figures 4C, 4D:
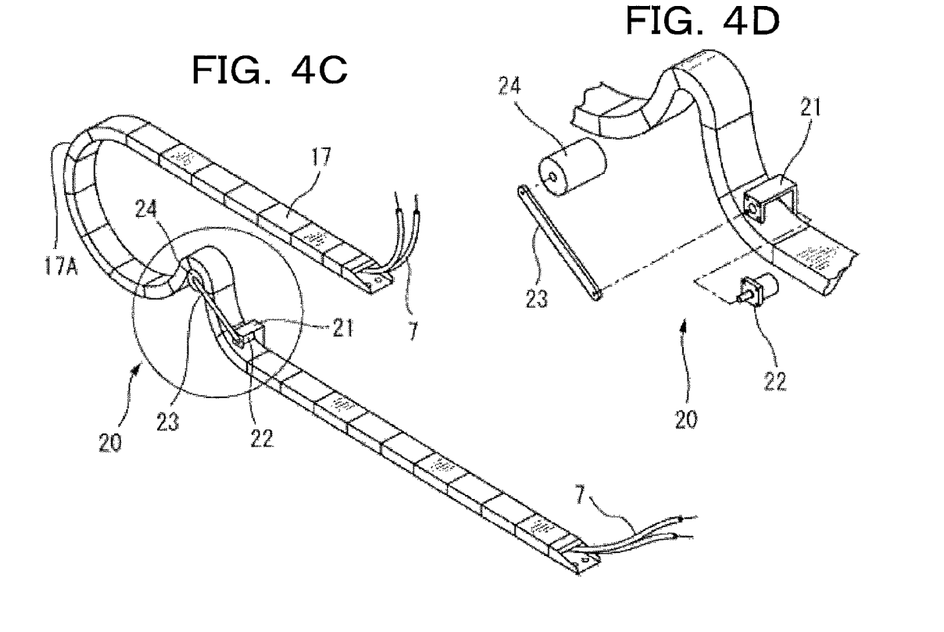
FIG. 4C illustrates an example of a deformed portion of a cable protective tube.
FIG. 4D illustrates an example of an exploded perspective view of a component of a cable protective tube deformation device.

Therefore, a cable protective tube deformation device 20 is equipped on the bottom plate of the first drawer section 11 in the fifth row of the HDD storage section 6. FIG. 4D illustrates an example of an exploded perspective view of components that form a cable protective tube deformation device. The cable protective tube deformation device 20 includes, as illustrated in FIG. 4D, a bracket 21, a motor 22, an arm 23, and a roller 24. The bracket 21 is attached on the bottom plate of the first drawer section 11, and the motor 22 is attached to the bracket 21. The arm 23 is attached to a rotary shaft of the motor 22, and the roller 24 is rotatably attached to a free end of the arm 23. The roller 24 is inserted between the bottom plate of the first drawer section 11 and the cable protective tube 17, and a tip end portion of the arm 23 is usually located on the bottom plate of the first drawer section 11 by the motor 22, so that the roller 24 does not rise.

For example, power is distributed to the motor 22 in the state illustrated in FIG. 4A, and when the motor 22 rotates, the arm 23 rotates and the roller 24 attached to the tip end portion of the arm 23 rises to lift the cable protective tube 17. FIG. 4B illustrates an example of a change in position of a folded up section of a cable protective tube. FIG. 4B illustrates a state in which the roller 24 attached to the tip end portion of the arm 23 rises and the cable protective tube 17 is lifted. When the cable protective tube 17 is lifted, the position of the folded up section 17A of the cable protective tube 17 moves from front of the cells 5 in the center row of the HDD storage section 6 to front of the cells 5 in the fourth row. FIG. 4C illustrates an example of a deformed portion of a cable protective tube. FIG. 4C illustrates a state in which the cable protective tube 17 is lifted upward. FIG. 4C also illustrates the connection cables 7 inserted into the cable protective tube 17. The number of the connection cables 7 may be arbitrary.

Figure 6:
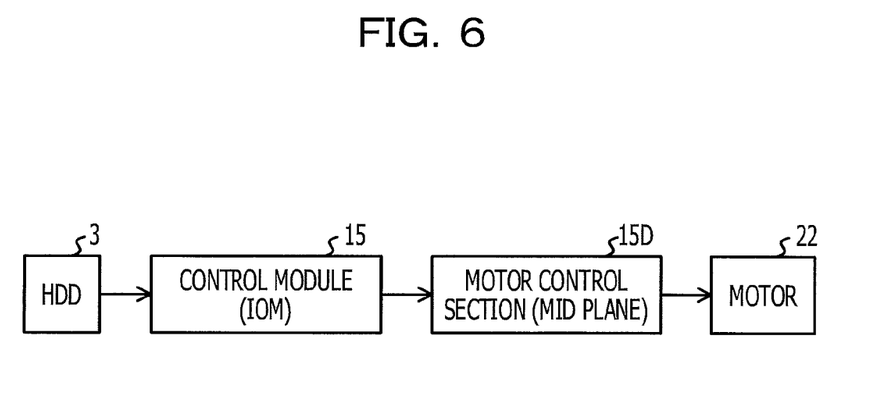
FIG. 6 illustrates an example of a motor driving circuit.

FIG. 6 illustrates an example of a motor driving circuit. FIG. 6 illustrates a circuit to drive the motor 22 used for the cable protective tube deformation device 20. The control module 15 controls driving of the HDDs 3. When an error occurs in the HDD 3, the position of the HDD 3 in which the error occurs is specified, so that a maintenance operator is contacted to replace the HDD 3. In a case that the position of the HDD 3 in which the error occurs is the HDD 3 in the cell 5 in the center row of the HDD storage section 6, a command is issued to the driving section (motor control section) 15D in the control module 15 to drive the motor 22 of the cable protective tube deformation device 20.

For example, in the drawing in the state in which the motor 22 of the cable protective tube deformation device 20 rotates from the state illustrated in FIG. 4A and the roller 24 rises to bring the folded up section 17A of the cable protective tube 17 in the position of FIG. 4B, actual dimensions may not be written. The cable protective tube deformation device 20 may determine an amount of rotation of the motor 22, a length of the arm 23, and a diameter of the roller 24 so as to move the position of the folded up section 17A of the cable protective tube 17 from the front of the center row to the front of the cells 5 in the fourth row when the cable protective tube 17 is lifted. In a case that an amount of lifting the cable protective tube 17 by the cable protective tube deformation device 20 is not sufficient, two of the cable protective tube deformation devices 20 may be equipped. For the cable protective tube deformation device 20, a solenoid or another actuator may also be used instead of the motor 22.

As illustrated in FIG. 4A and FIG. 4B, when the position of the bracket 21 of the cable protective tube deformation device 20 is fixed, a HDD may not be inserted in the cell 5 in the lowermost tier in the fifth row. When the bracket 21 formed slidingly is possible to move to the front of the cells in the fourth row, a HDD is also inserted in the cell 5 in the lowermost tier in the fifth row and replaced when an error occurs. A dedicated switch to drive the motor 22 may also be equipped in the control module 15. In a case that the position of the HDD 3 in which the error occurs is in the cell 5 in the center row of the HDD storage section 6, an operator visually confirms the state and presses the dedicated switch to drive the motor 22 of the cable protective tube deformation device 20.

Figure 8:
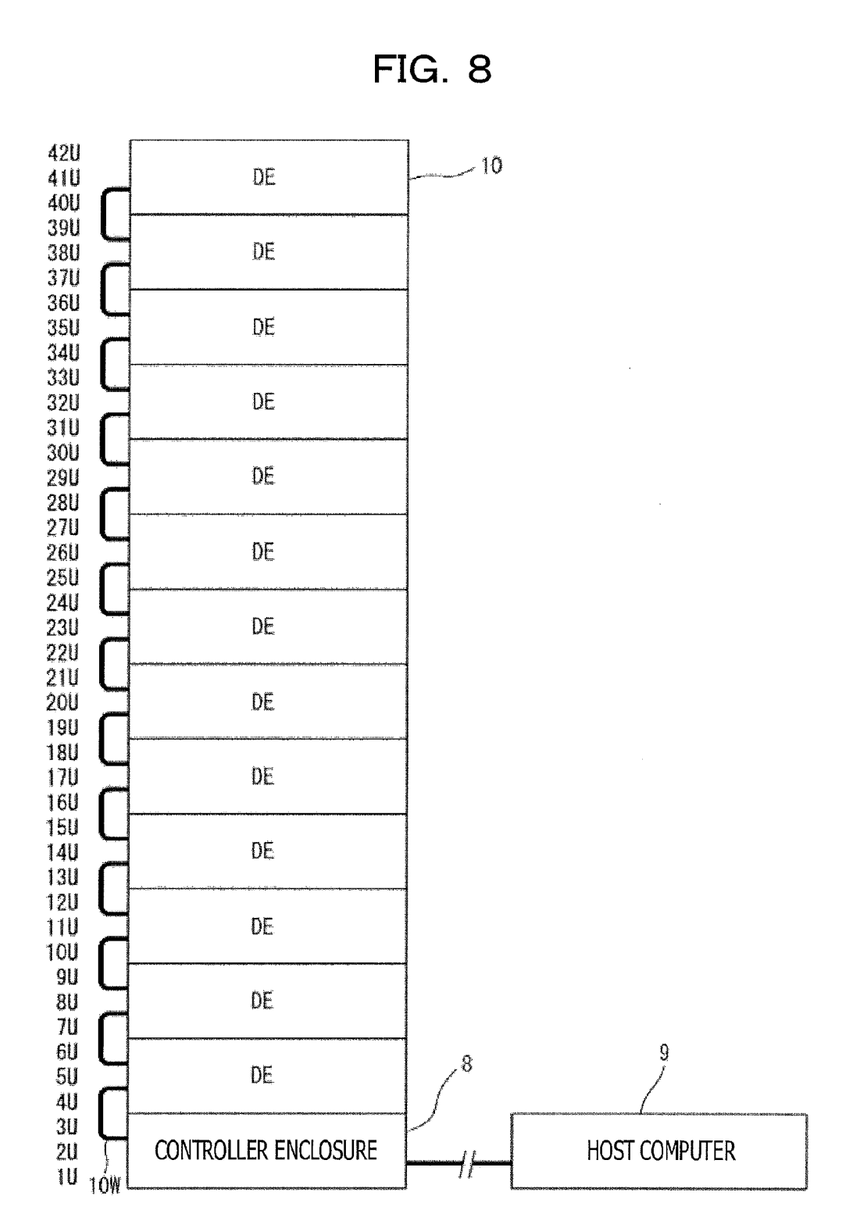
FIG. 8 illustrates an example of a rack mount devices and an example of a host computer.

FIG. 8 illustrates an example of a rack mount device and an example of a host computer. As illustrated in FIG. 8, a controller enclosure 8 is installed in the lowermost tier, and 13 rack mount devices 10 with a 3 U height are installed in a 19-inch rack. Each rack mount device 10 installed in the 19-inch rack is coupled by a connection wire 10W and then are coupled to a host computer 9.

Figure 9:
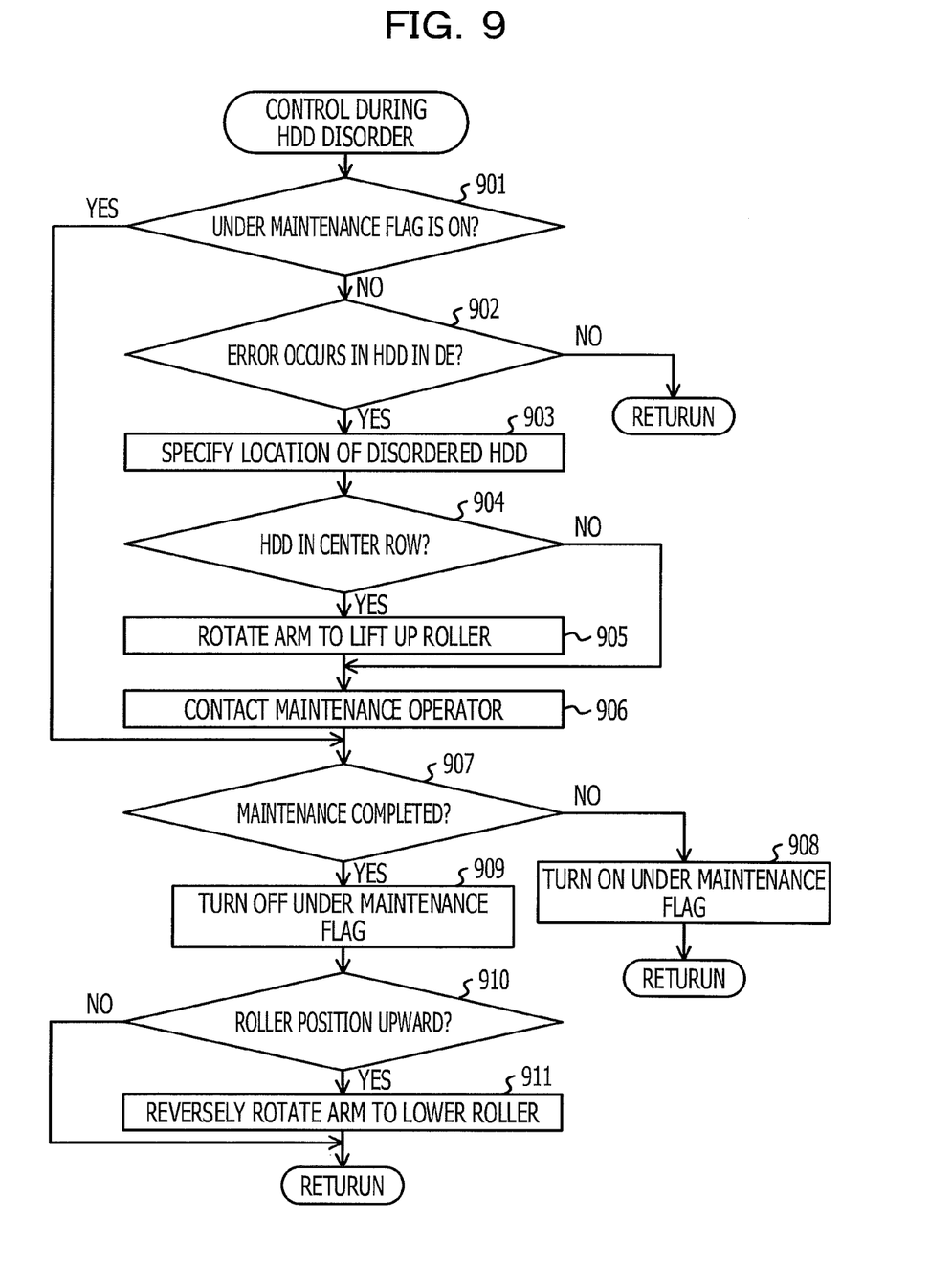
FIG. 9 illustrates an example of a procedure to drive a cable protective tube deformation device.

FIG. 9 illustrates an example of a procedure to drive a cable protective tube deformation device. In FIG. 9, the control module 15 of the rack mount device 10 detects a disorder (error) of a HDD and informs a maintenance operator of the HDD in which the error occurs, and thus the HDD in which the error occurs is replaced. Determination of a HDD disorder carried out by the control module 15 may be carried out, for example, at a certain time interval.

In operation 901, whether or not an under maintenance flag is on is determined. In a case that the under maintenance flag is off (NO), the process goes on to operation 902 to determine whether or not an error occurs in any HDD in the DEs (rack mount devices) installed in the 19-inch rack. In a case that there is no error in any HDD in the DEs, the process is terminated. In a case that an error occurs in any HDD in the DEs, the process goes on to operation 903 to specify the DE in which the error occurs in the HDD and the location (which row) of the HDD storage section in which the disordered HDD exists.

In operation 904, whether or not the row of the HDD storage section in which the disordered HDD exists is in the center row is determined. In a case that the row of the HDD storage section in which the disordered HDD exists is the center row (YES), the process goes on to operation 905, whereas in a case that the row of the HDD storage section in which the disordered HDD exists is not the center row (NO), the process goes on to operation 906. In operation 905, the motor of the cable protective tube deformation device is driven to rotate the arm and an operation to lift up the roller is carried out and the process goes on to operation 906. In operation 906, a maintenance operator is contacted for the presence of a disorder in the HDD and the process goes on to operation 907.

In operation 907, whether or not the disordered HDD is replaced by the maintenance operator and the maintenance is completed is determined. When the disordered HDD is not replaced and the maintenance is not completed (NO), the process goes on to operation 908 to turn on the under maintenance flag and the process is terminated. When the under maintenance flag is turned on in operation 908, the determination in operation 901 becomes YES when the control is started for the next time, and the process goes on from operation 902 to operation 907 without carrying out operation 906.

When it is determined in operation 907 that the disordered HDD is replaced by the maintenance operator and the maintenance is completed, the process goes on to operation 909 to turn off the under maintenance flag and the process goes on to operation 910. In operation 910, whether or not the roller position is upward is determined, and in a case that the roller position is not upward, the process is terminated. In a case that it is determined in operation 910 that the roller position is upward, the process goes on to operation 911 to drive the motor of the cable protective tube deformation device and reversely rotate the arm to carry out an operation to lower the roller, and then the process is terminated.

Due to the above operation of the control module, no matter the position of the HDD in which the error occurs in the DE is in any row of the HDD storage section, when the maintenance operator arrives to withdraw the DE from the 19-inch rack, the HDD in which the error occurs may be replaced.

Figure 10:
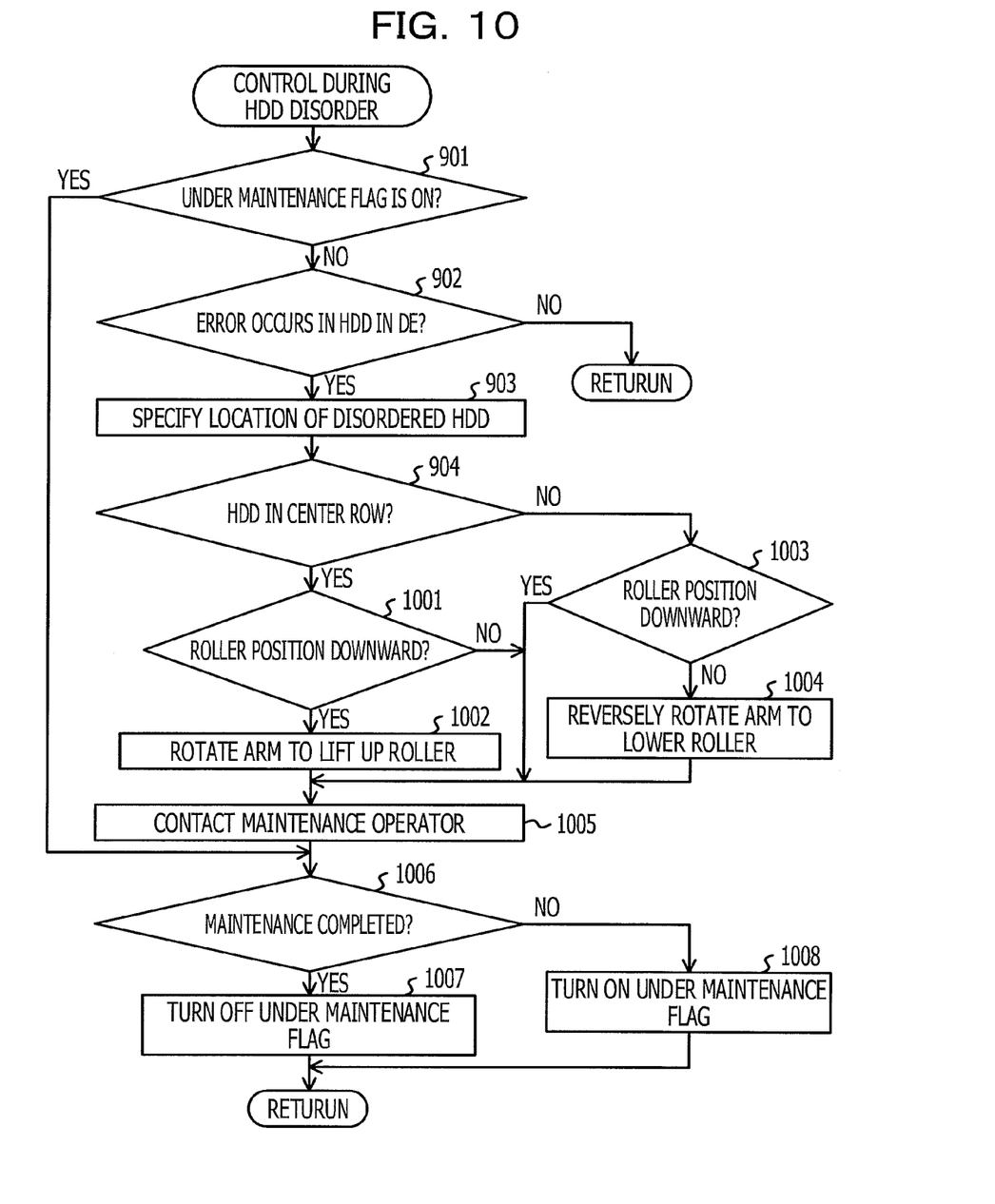
FIG. 10 illustrates an example of a procedure to drive a cable protective tube deformation device.

FIG. 10 illustrates an example of a procedure to drive a cable protective tube deformation device. In FIG. 10, the control module 15 of the rack mount device 10 detects an error of a HDD and informs a maintenance operator of the HDD in which the error occurs to replace the HDD in which the error occurs. The determination of a HDD disorder carried out by the control module 15 may be carried out, for example, at a certain time interval. In FIG. 10, the same operation number is assigned to a control substantially the same as or similar to the control illustrated in FIG. 9 and the description may be omitted or reduced.

In operation 901, whether or not an under maintenance flag is on is determined. In a case that the under maintenance flag is off (NO), the process goes on to operation 902. Whether or not an error occurs in any HDD in the DEs (rack mount devices) installed in the 19-inch rack is determined. In a case that there is no error in any HDD in the DEs, the process is terminated. In a case that an error occurs in any HDD in the DEs, the process goes on to operation 903 to specify the DE in which the error occurs and the location (which row) of the HDD storage section in which the disordered HDD exists. In operation 904, whether or not the row of the HDD storage section in which the disordered HDD exists is in the center row is determined. The controls so far may be substantially same as or similar to the controls illustrated in FIG. 9.

In a case that the determination in operation 904 is that the row of the HDD storage section in which the disordered HDD exists is the center row (YES), the process goes on to operation 1001, whereas in a case that the row of the HDD storage section in which the disordered HDD exists is not the center row (NO), the process goes on to operation 1003. In operation 1001 performed in a case that the row of the HDD storage section in which the disordered HDD exists is the center row, whether or not the roller position is downward is determined. In a case that the roller position is downward, the process goes on to operation 1002 to drive the motor of the cable protective tube deformation device and rotate the arm and an operation to lift up the roller is carried out. The process goes on to operation 1005. In a case that the roller position is upward (NO) in the determination in operation 1001, the process goes on to operation 1005 without carrying out anything.

In operation 1003 performed in a case that the row of the HDD storage section in which the disordered HDD exists is not the center row (YES) in the determination in operation 904, whether or not the roller position is downward is determined. In a case that the roller position is downward (YES), the process goes on to operation 1005 without carrying out anything, whereas in a case that the roller position is not downward (NO), the process goes on to operation 1004. In operation 1004, the motor of the cable protective tube deformation device is driven to reversely rotate the arm and an operation to lower the roller is carried out. The process goes on to operation 1005.

In operation 1005, the maintenance operator is contacted that there is a disorder in the HDD and the process goes on to operation 1006. In operation 1006, whether or not the disordered HDD is replaced by the maintenance operator and the maintenance is completed is determined. When the disordered HDD is not replaced and the maintenance is not completed (NO), the process goes on to operation 1008. The under maintenance flag is turned on, and the process is terminated. When the under maintenance flag is turned on in operation 1008, the determination in operation 901 becomes YES when the control is started for the next time, and the process goes on to operation 1006 without carrying out operation 902 through operation 904 and operation 1001 through operation 1005. When it is determined in operation 1006 that the disordered HDD is replaced by the maintenance operator and the maintenance is completed, the process goes on to operation 1007. The under maintenance flag is turned off, and the process is terminated.

Due to the above operation of the control module, no matter the position of the HDD in which the error occurs in the DE is in any row of the HDD storage section, when the maintenance operator arrives to withdraw the DE from the 19-inch rack, the HDD in which the error occurs may be replaced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A rack mount device comprising:
a housing;
a first drawer section and a second drawer section, provided in the housing, configured to be withdrawable from the housing;
storage sections provided in the first drawer section and the second drawer section respectively, each of storage sections being capable of including a plurality of memory devices;
a control module, provided on an upper side of the storage sections, configured to control the plurality of memory devices;
a connection cable configured to couple an external connection terminal of the housing and the control module and include an excess length portion corresponding to movement of the control module based on a drawing operation of the first drawer section or the second drawer section;
a cable protective tube configured to be inserted by the excess length portion, one end of the cable protective tube being fixed in a vicinity of a connection portion to the control module of the connection cable, another end of the cable protective tube being fixed on a bottom plate side of the housing, the cable protective tube including a folded-up section which moves along with the drawing operation of one of the first drawer section and the second drawer section between the one end and the another end; and a cable protective tube deformation device configured to move the folded-up section in a state in which the first drawer section is fixed at a first specific position and the second drawer section is fixed at a second specific position.

2. The rack mount device according to claim 1, wherein the plurality of memory devices are arranged in a height direction and a horizontal direction.

3. The rack mount device according to claim 1, further comprising,
a slide rail, provided between the housing and the first and second drawer sections, configured to slide the first and second drawer sections independently.

4. The rack mount device according to claim 1, wherein the cable protective tube is deformable only in a vertical direction.

5. The rack mount device according to claim 1, wherein the folded-up section includes:
a bent portion configured to be bent in an arc shape from a ceiling plate side to the bottom plate side of the housing, and
a linear portion configured to be arranged between the folded-up section and the cable protective tube and not to overlap the storage section.

6. The rack mount device according to claim 3, wherein the folded-up section is located in front of a row of the plurality of memory devices which is furthest from the external connection terminal in a state where the first drawer section or the second drawer section is stored in the housing, and
the folded-up section is located in front of a center row of the plurality of memory devices in a state where withdrawal of the first drawer section or the second drawer section is completed.

7. The rack mount device according to claim 1, wherein the cable protective tube deformation device deform to curve a linear portion on one of a ceiling plate side and a bottom plate side of the cable protective tube and moves the folded-up section of the cable protective tube.

8. The rack mount device according to claim 1, wherein the cable protective tube deformation device includes:
a motor installed on a bottom plate side of the first drawer section and the second drawer section;
an arm configured to be fixed to a rotary shaft of the motor; and
a roller provided in a tip end portion of the arm.

9. The rack mount device according to claim 8, wherein the roller is inserted between the cable protective tube and one of the first drawer section and the second drawer section, and
the motor rotates to operate the cable protective tube to be lifted by the roller in the tip end portion of the arm and the folded-up section of the cable protective tube moves.

10. The rack mount device according to claim 8, wherein an amount of rotation of the motor, a length of the arm, and a diameter of the roller are set so that the folded-up section of the cable protective tube moves between adjacent rows of the plurality of memory devices when the cable protective tube is lifted by the roller.

11. The rack mount device according to claim 1, wherein in a case that the memory device to be removed from the first drawer section or the second drawer section is in a row different from a center row of the storage section, the control module does not instruct the cable protective tube deformation device to move the folded-up section.

12. The rack mount device according to claim 1, wherein in a case that the memory device to be removed from the first drawer section or the second drawer section is in the storage section in a center row, the control module instructs the cable protective tube deformation device to move the folded-up section before withdrawing the first or second drawer section from the housing.

13. The rack mount device according to claim 1, further comprising,
a midplane, provided on a side plate side of the storage section, configured to couple the plurality of memory devices inserted in the storage section and the control module.

14. The rack mount device according to claim 1, further comprising,
a power supply unit, provided between the storage section and the external connection terminal, configured to supply a power supply to the control module.

15. The rack mount device according to claim 1, wherein the external terminal is capable of signal transfer by being coupled to another rack mount device that is mounted in a vertical direction of the rack.

16. The rack mount device according to claim 1, wherein the housing is controlled by being coupled to a host computer together with another rack mount device.

17. The rack mount device according to claim 1, wherein the memory device is a 3.5-inch hard disk device.

18. The rack mount device according to claim 1, wherein the rack is a 19-inch rack.

19. The rack mount device according to claim 1, wherein the first specific position is a position in which the first drawer section is withdrawn furthest from the housing and the second specific position is a position in which the second drawer section is withdrawn furthest from the housing.

20. The rack mount device according to claim 1, wherein the cable protective tube deformation device includes a roller provided underlying the cable protective tube, and the folded-up section is moved with a lifting operation of the cable protective tube by the roller.

* * * * *